Feb. 21, 1961 S. R. O'DETTE 2,972,411
DEHYDRATING AND FILTERING APPARATUS
FOR LIQUID DIELECTRICS
Filed Nov. 19, 1957 2 Sheets-Sheet 1
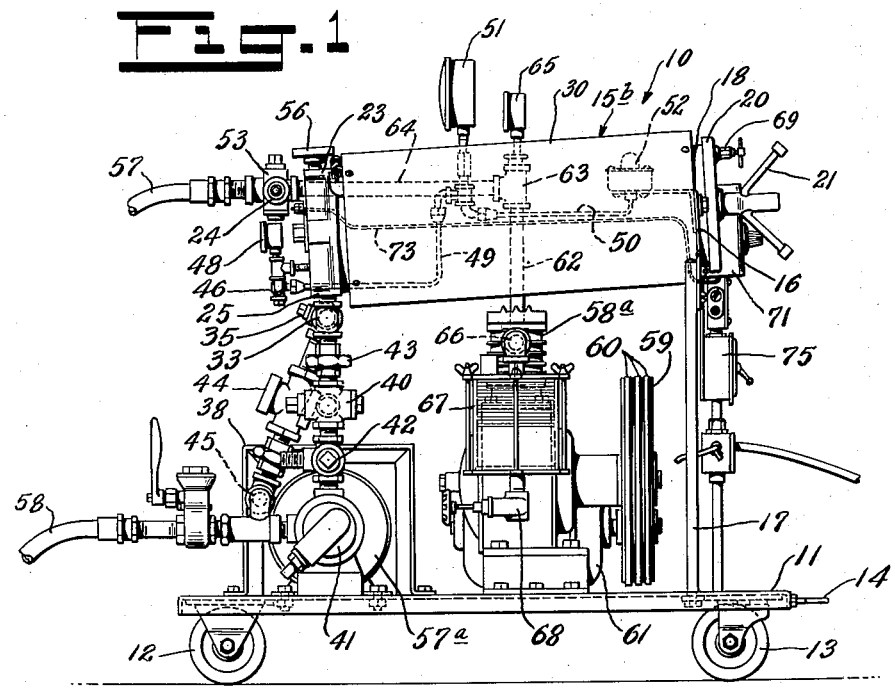
INVENTOR.
STANLEY R. O'DETTE
BY
H. G. Manning
ATTORNEY

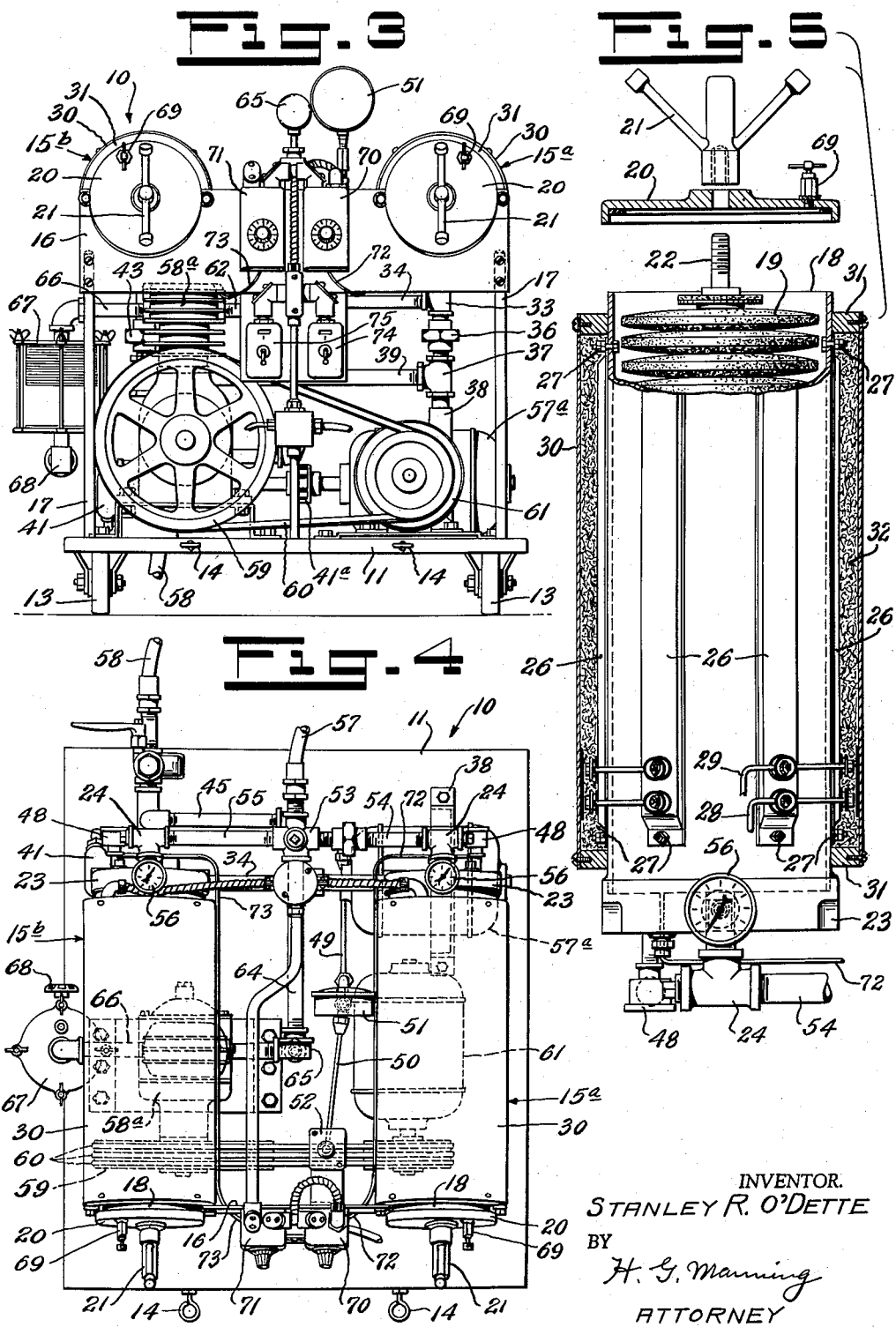

United States Patent Office 2,972,411
Patented Feb. 21, 1961

2,972,411
DEHYDRATING AND FILTERING APPARATUS FOR LIQUID DIELECTRICS

Stanley R. O'Dette, 1422 Martine Ave., Plainfield, N.J.

Filed Nov. 19, 1957, Ser. No. 697,476

3 Claims. (Cl. 210—91)

My invention relates to dehydrating and filtering devices and is directed particularly to dehydrating and filtering apparatus for the treatment of dielectric liquids such as are used in electrical power equipment.

It is well known that before the liquid dielectric (usually a liquid petroleum product) employed in electrical equipment, such as transformers, switches, etc., reaches a moisture content which impairs the insulating characteristics to such an extent that short-circuiting of the associated apparatus may occur, it is necessary to dehydrate the liquid to restore it to as low a moisture content as is commercially practicable. Also, such dielectric liquids deteriorate during use, producing microscopic hygroscopic solid particles which must also be removed from time to time.

It is the principal object of my invention to provide an improved apparatus for simultaneously dehydrating and filtering the liquid dielectric of an electrical power equipment without removing substantial quantities of such liquid from the apparatus, and without putting the apparatus out of service.

It is another object of my invention to provide filtering and dehydrating apparatus of the character described which is highly efficient, and substantially continuous in operation with respect to its use in filtering and dehydrating the dielectric liquid in a piece of electrical equipment.

Another object of my invention is to provide a filtering and dehydrating apparatus of the above nature, which is compact so as to be readily portable from place to place, which includes means for testing the moisture content and clarity of the liquid while under treatment, and which is comparatively low in cost, and fool-proof in operation.

A more particular object of the invention is to provide a pair of combination filtering and dehydrating units connectable alternately into a flow circuit for pumping dielectric liquid to and from the equipment being reconditioned, and means in the filtering and dehydrating units for alternately removing the moisture absorbed therein from the liquid being treated from one of the units, while the other is connected in the circuit for filtering and dehydrating the dielectric liquid.

Other objects, features and advantages of my invention will be apparent from the following description when read with reference to the accompanying drawings, wherein:

Fig. 1 is a side view of an apparatus for dehydrating and filtering a dielectric liquid, embodying the invention, Fig. 2 is a front end view of the apparatus, Fig. 3 is a rear end view thereof, Fig. 4 is a top view of the same, and Fig. 5 is a longitudinal cross-sectional view of one of the filtering and dehydrating units shown by itself.

Referring now to the drawings, in which like reference numerals denote corresponding parts throughout the several views, the dehydrating and filtering apparatus embodying the invention is generally denoted by the reference numeral 10, and comprises a rectangular metal base 11 movably supported on a pair of front wheels 12 and a pair of rear wheels 13.

The rear end of the base 11 is fitted with a pair of hook eyes 14, by means of which the apparatus may readily be pulled from place to place as desired, the rear wheels 13 preferably being swiveled to the base 11 to facilitate moving the apparatus about.

In the larger capacity dehydrating and filtering units, the apparatus, may if desired, be mounted on a suitable wheeled trailer, meeting highway requirements.

Supported in spaced position above the base 11, and slightly downwardly inclined from the rear to the front thereof, are a pair of cylindrical combination dehydrating and filtering units, generally denoted by the reference numerals 15a and 15b, the rear ends of said units being bolted to a common lateral vertical yoke plate 16 (Fig. 2), the ends of which are secured to the base 11 by a pair of support posts 17 fixed between said yoke and said base. The front ends of the units 15a and 15b are supported on the base 11 by suitable piping to be hereinbelow described.

Each of the filtering and dehydrating units 15a, 15b is comprised of a cylindrical wall 18 (see Fig. 5) containing one or more cartridges of multiple-disc convexo-convex filter elements 19, which may be removed for replacement, when spent, by unscrewing a back end plate 20 from a center post 22, by means of a forked handle 21 (Figs. 1 and 5). Each of the multiple-disc filter elements 19 is preferably composed of predried asbestos-cellulose.

The dielectric liquid to be treated enters the lower front inlet end 23 of the unit 15a or 15b through a T-connector 24. From this inlet, the liquid passes from the outsides of the individual discs of the filter elements 19, through the central zone thereof, and through the vertical outlet openings 25 in the front end 23 of the units 15a, 15b.

Provision is also made of means for heating the interior of the units 15a, 15b. To this end, as illustrated in Fig. 5, each cylindrical wall 18 is equipped with a plurality of parallel electrical resistance heating strips 26, peripherally spaced about said wall and secured thereto as by bolts 27. The heating strips 26 are connected in parallel by conductors 28, 29, which are periodically energized, as will be hereinbelow described.

An outer jacket 30 is secured in spaced relation to the cylindrical wall 18 by means of annular end members 31, the annular space defined between said jacket and said wall being filled with a suitable heat-insulating material 32.

The outlet openings 25 of the dehydrating and filtering units 15a and 15b each connect with T-connectors 33, one outlet of which joins a horizontal pipe 34 with a three-way two-port drain suction valve 35. The other outlet of the T-connector 33 associated with the unit 15a is connected through a union 36 to a T-connector 37 plugged at its lower end, and supported by an inverted U-shaped support member 38, secured to the base 11.

The remaining outlet of the T-connector 37 communicates through a horizontal pipe 39 with a four-way two-port discharge valve 40 which communicates with and is supported by a liquid pump 41 fixed upon the base 11, through a coupling member 42. The remaining port of the T-connector 33 associated with the unit 15b is connected through a union 43 to the remaining port of the discharge valve 40.

The discharge outlet of the drain suction valve 35 is connected through a sight glass 44 and a conduit 45 to a discharge suction port of the liquid pump 41.

By means of this construction, it will be apparent that the front ends of the dehydrating and filtering units 15a and 15b will be secured by the described piping to the support bracket 38 and the liquid pump 41, both of which are secured in turn to the base 11.

A three-way valve 46 (Fig. 2) is connected through a pair of conduits 47 to the pressure side of each of the units 15a and 15b, individual pressure gauges 48 also being connected in each of said conduits. The three-way valve 46 is also connected through conduits 49 and 50 to a common pressure gauge 51 and a common pressure-actuated indicator lamp 52, for the purpose hereinbelow described (see Fig. 1).

The T-connectors 24 at the input of each of the dehydrating and filtering units 15a and 15b are connected to a three-way three-port transfer valve 53 (Fig. 4) through a pair of inwardly-extending conduits 54 and 55. Individual pressure gauges 56 are also connected in the conduits 54, 55. One input port of the transfer valve 53 is connected to one end of a length of flexible hose 57, the other end of which is connected to the unit of electrical equipment to be processed for withdrawing the dielectric liquid therefrom.

The outlet port of the liquid pump 41 similarly has connected thereto one end of a length of hose 58 (Figs. 1 and 4), the other end of which is also connected to the electrical equipment for continuously returning the processed liquid.

It will thus be apparent, that during the processing of the dielectric liquid, only such a small portion thereof is removed from the electrical equipment at any instant that no interruption of service will take place.

The liquid pump 41 (Fig. 2) is driven through a coupling unit 41a, by an electric motor 57a mounted on the base 11, and straddled by the U-shaped support member 38. Also mounted upon the base 11, near the end thereof, is an air-cooled vacuum pump 58a capable of producing a vacuum of at least 29 inches, which has a pulley 59 (Fig. 3) driven by V-belts 60 transmitting rotary power from a second electric motor 61, also secured upon the base 11. Magnetic clutches or couplings are also employed to drive all liquid pumps and vacuum pumps from the motor 57a.

The suction port of the vacuum pump 58a is connected by a pipe 62 (Fig. 1) to a T-connector 63 (Fig. 1) which in turn is connected by a pipe 64 to the remaining port of the three-way three-port transfer valve 53. A vacuum gauge 65 is connected to the remaining opening of the T-connector 63 (see Figs. 1, 2 and 4).

The exhaust port of the vacuum pump 58a is connected by piping 66 to an impingement barrier unit 67 (Fig. 1) having a tortuous passage which coalesces the moisture contained in the exhausted air into liquid form, which can be drained off through a valve 68 at the lower end of said unit.

Each of the dehydrating and filtering units 15a, 15b has an air inlet valve 69 (Figs. 1, 3, 4, and 5) in its back plate 20, to permit pumping out oil vapors at the start of each operating cycle, as hereinbelow described.

The electrical heating conductors 28, 29 for each of the dehydrating and filtering units 15a and 15b are individually energized through a pair of thermostatically controlled switches 70, 71 secured against the vertical yoke plate 16 (see Figs. 3 and 4).

Provision is also made of temperature sensing elements 72, 73 which lead from the thermostatically controlled switches 70, 71 into the respective front ends of the units 15a and 15b. Provision is also made of a pair of switches 74 and 75, secured below the thermostatically controlled switches 70, 71, to control energization of the liquid pump 41 and the vacuum pump 58a.

*Operation*

In use, the flexible hoses 57 and 58 will be connected to the piece of electrical equipment to be processed, and the pump 41 will be energized for drawing the liquid dielectric through one of the dehydrating and filtering units (unit 15a for example), after first appropriately setting the three-way, three-port transfer valve 53 and the discharge valve 40, to direct the liquid through said unit. The dielectric liquid will then be pumped through the filtering and moisture absorption barriers 67 until there is indication that the filter elements 19 in the unit 15a have reached saturation. This will result in increased pressure in the unit 15a, as indicated by the common pressure-actuated lamp 52, or the pressure gauge 51, which are now connected with said unit through the transfer valve 53.

The increase in pressure is due to the expansion of the cellulose asbestos material comprising the filter elements 19 during absorption of moisture. Liquid pumping will be stopped before water agglomeration occurs. The transfer valve 53 and the discharge valve 40 will then be adjusted, to transfer liquid flow through the companion unit 15b, and the processing will be continued. At the same time, the suction valve 35 will be turned to drain the liquid from the unit 15a through the sight glass 44, along with the liquid being pumped back into the electrical equipment. While the units 15a or 15b are thus being drained, the corresponding air vent valve 69 in the back plate 20 will be temporarily opened.

To dehydrate the first-used unit 15a, the heating elements 26 thereof will then be energized by means of the thermostatically controlled switch 70, to bring the temperature of the chamber within said unit to between 160 degrees and 200 degrees F. The vacuum pump 58a will then be energized, and since said pump is connected with the unit 15a through the transfer valve 53, the moisture contained in the filter elements 19 of said unit will be removed, said moisture first being converted into liquid form by the impingement barrier unit 67, the valve 68 of which will be opened manually from time to time to drain the water therefrom.

When the vacuum gauge 65 levels off momentarily and again begins to climb, this indicates that the previously saturated filtering elements 19 in the unit 15a are dry, and ready for use again. The vacuum pump 58a will then be stopped, and the heating elements 26 deenergized.

This dehydration cycle will be completed well before the unit 15b now in use, is spent, so that a substantially continuous operating cycle is made possible by the alternate use of the filter units 15a and 15b, as described above.

It will further be noted that the entire system is a sealed circuit and therefore is insensitive to ambient conditions.

One advantage of the present invention is that it permits continuous precision filtering and dehydration of dielectric liquids and other liquids to points well below their normal moisture saturation levels.

Among the liquids which may be efficiently treated by the present apparatus are the following:

(1) Transformer oils
(2) Circuit breaker oils
(3) Switch oils
(4) Converter or rectifier coolants
(5) Hollow cable oils
(6) Pipe cable oils
(7) Precision quenching liquids
(8) Jet aircraft and guided missile fuels
(9) Synthetic jet aircraft and missile lubricants
(10) Precision hydraulic liquids While I have described herein one form in which my invention may conveniently be embodied in practice, it is to be understood that this form is given by way of illustration only, and that the invention is not limited to the particular disclosure, but may be modified and embodied in various other equivalent forms without departing from its spirit. In short, the invention includes all the modifications and embodiments coming within the scope of the following claims.

Having thus fully described the invention, what is claimed as new, and for which it is desired to secure Letters Patent, is:

1. In an apparatus for reconditioning the liquid dielectric of an electrical apparatus, a pair of alternately operated filtering and dehydrating cylindrical units, each containing a row of fibrous absorbent convex filter disks arranged in face to face contact therein, means to pass the liquid dielectric from said electrical apparatus through one of said units to remove the moisture from said dielectric, while simultaneously removing the moisture from the saturated disks of the other of said units which has absorbed it from the liquid dielectric in a previous cycle of operation.

2. The invention as defined in claim 1, in which electrical means are provided to heat the saturated disks and a vacuum pump is employed to dry the moisture from said saturated disks in the unit which has previously absorbed it from said apparatus.

3. The invention as defined in claim 1, in which the outward pressure exerted by the expansion of said row of disks is utilized to indicate when said unit is saturated with moisture from said apparatus.

References Cited in the file of this patent

UNITED STATES PATENTS

| | | |
|---|---|---|
| 596,518 | Knight | Jan. 4, 1898 |
| 2,143,949 | Keith | Jan. 17, 1939 |
| 2,195,989 | Hoffman | Apr. 2, 1940 |
| 2,273,350 | Fry et al. | Feb. 17, 1942 |
| 2,292,513 | Fourness | Aug. 11, 1942 |
| 2,356,890 | Schulze | Aug. 29, 1944 |
| 2,392,354 | Alsop | Jan. 8, 1946 |
| 2,429,321 | La Brecque | Oct. 21, 1947 |
| 2,440,784 | Perdew | May 4, 1948 |
| 2,685,347 | Busby | Aug. 3, 1954 |

FOREIGN PATENTS

| | | |
|---|---|---|
| 727,559 | France | Mar. 29, 1932 |